United States Patent [19]

Larsen

[11] 3,999,452
[45] Dec. 28, 1976

[54] TOOL FOR PREPARING TUBE ENDS FOR WELDING

[75] Inventor: Jens D. Larsen, Defiance, Ohio

[73] Assignee: Gardner-Denver Company, Dallas, Tex.

[22] Filed: Jan. 24, 1975

[21] Appl. No.: 543,692

[52] U.S. Cl. .................. 82/4 C; 144/205; 279/2 R; 408/80; 408/188; 408/713

[51] Int. Cl.$^2$ .......................... B23B 3/22

[58] Field of Search ............ 82/4 C; 144/205; 408/79, 80, 81, 82, 105, 106, 113, 188, 196, 224, 713; 279/2; 242/72 R

[56] References Cited

UNITED STATES PATENTS

| 905,305 | 12/1908 | Gage | 242/72 R |
|---|---|---|---|
| 2,630,725 | 3/1953 | Black | 408/224 |
| 3,229,555 | 1/1966 | Castles, Jr. | 82/4 C |
| 3,421,492 | 1/1969 | Brown | 408/80 X |
| 3,875,832 | 4/1975 | Mayfield | 82/4 C |

Primary Examiner—Othell M. Simpson
Assistant Examiner—Z. R. Bilinsky
Attorney, Agent, or Firm—Donnelly, Maky, Renner & Otto

[57] ABSTRACT

A tool for preparing tube ends for welding comprising a rotary tool head connected to the drive shaft of an air motor driven angle drive unit, said tool head having a plurality of radially extending arms provided with inclined cutting edges operative, upon rotation of the tool head and axial advance thereof with respect to the tube, to chamfer or bevel the end of the tube for welding, said tool head further being provided with guide means for rotation of the tool head about the tube axis. One form of tool herein is further characterized in that the cutter carrying arms are radially adjustable for chamfering different sizes of tubes. Another form of tool herein is further characterized in that at least one of the cutters is indexable to a position wherein the cutting edge thereof is perpendicular to the axis of the tube to dress the end surface of the tube. Yet another form of the tool herein is further characterized in that the tool head guide means is firmly secured within the tube end and provides a guide bore along which the tool head is accurately guided for chamfering the ends of hard-to-cut tubes as of stainless steel or the like.

8 Claims, 13 Drawing Figures

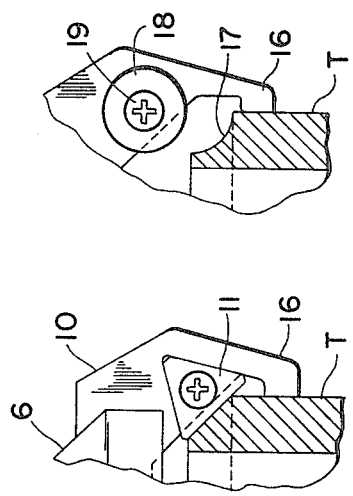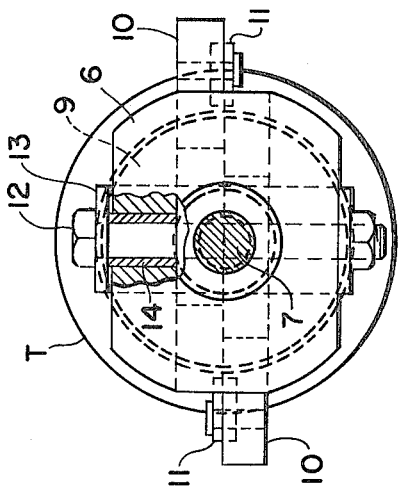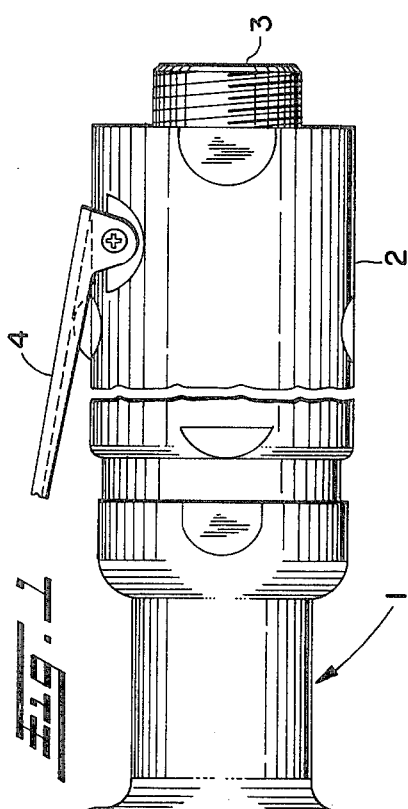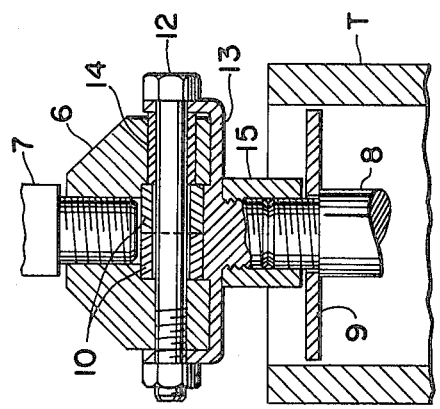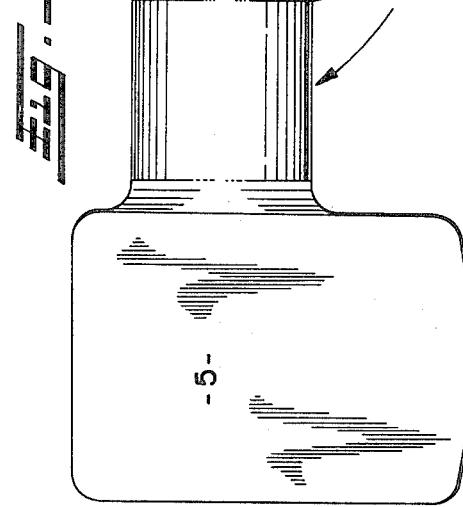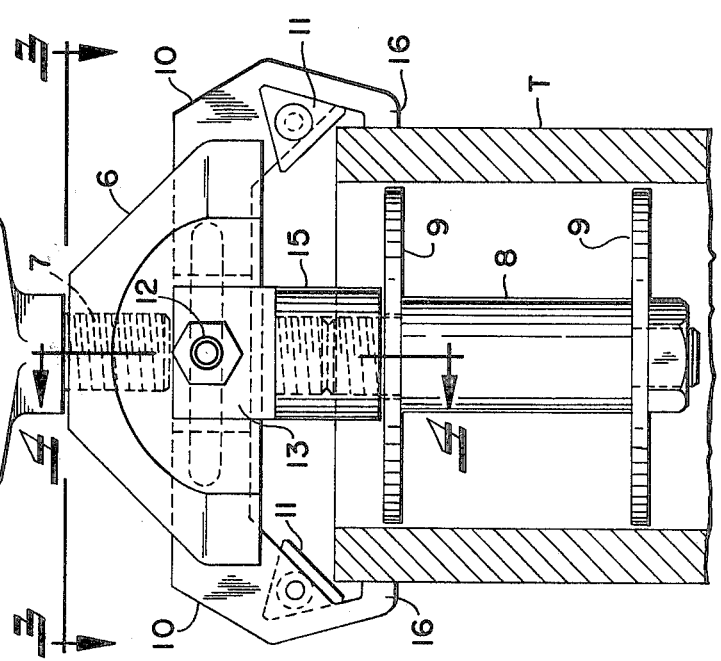

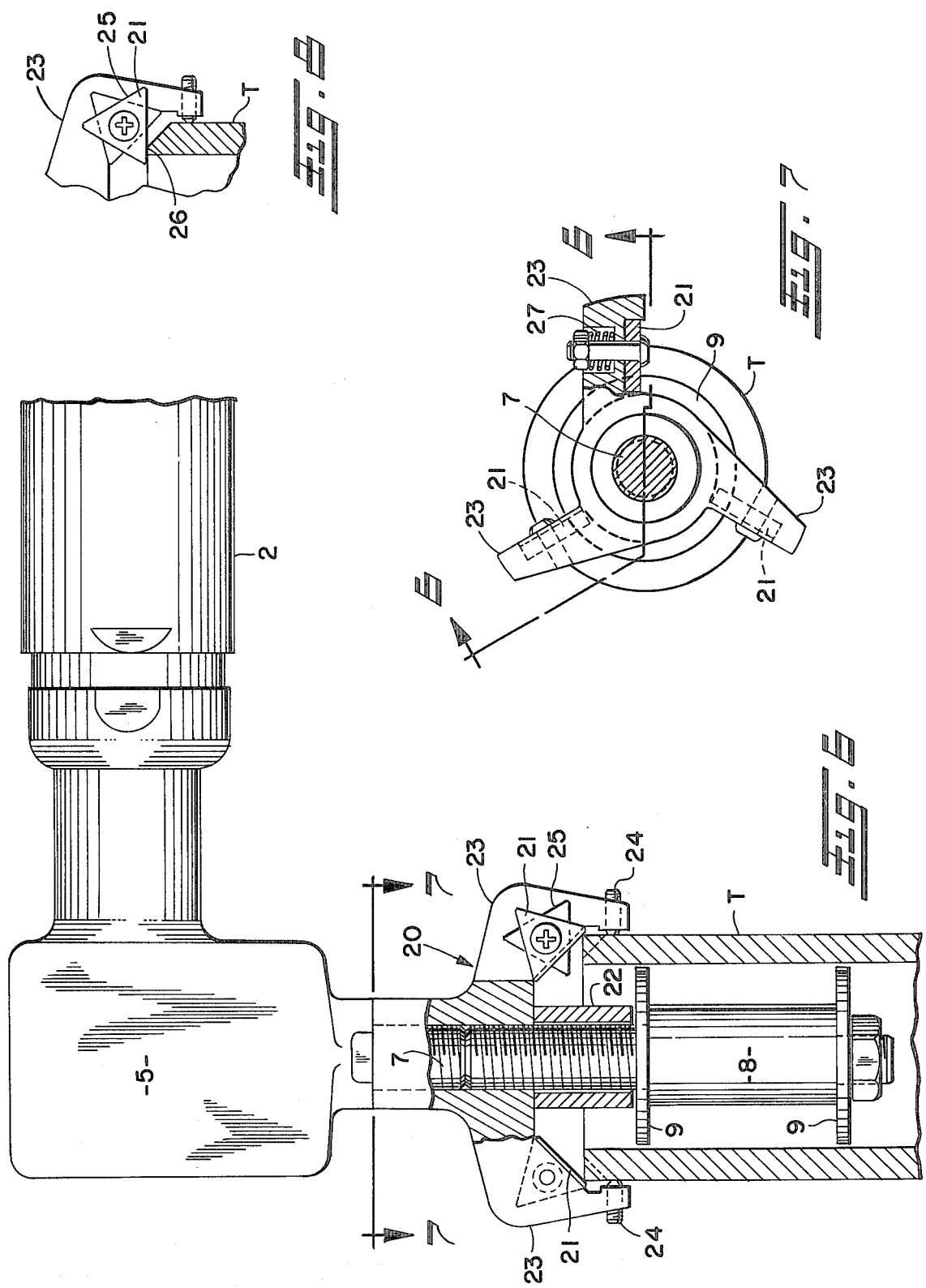

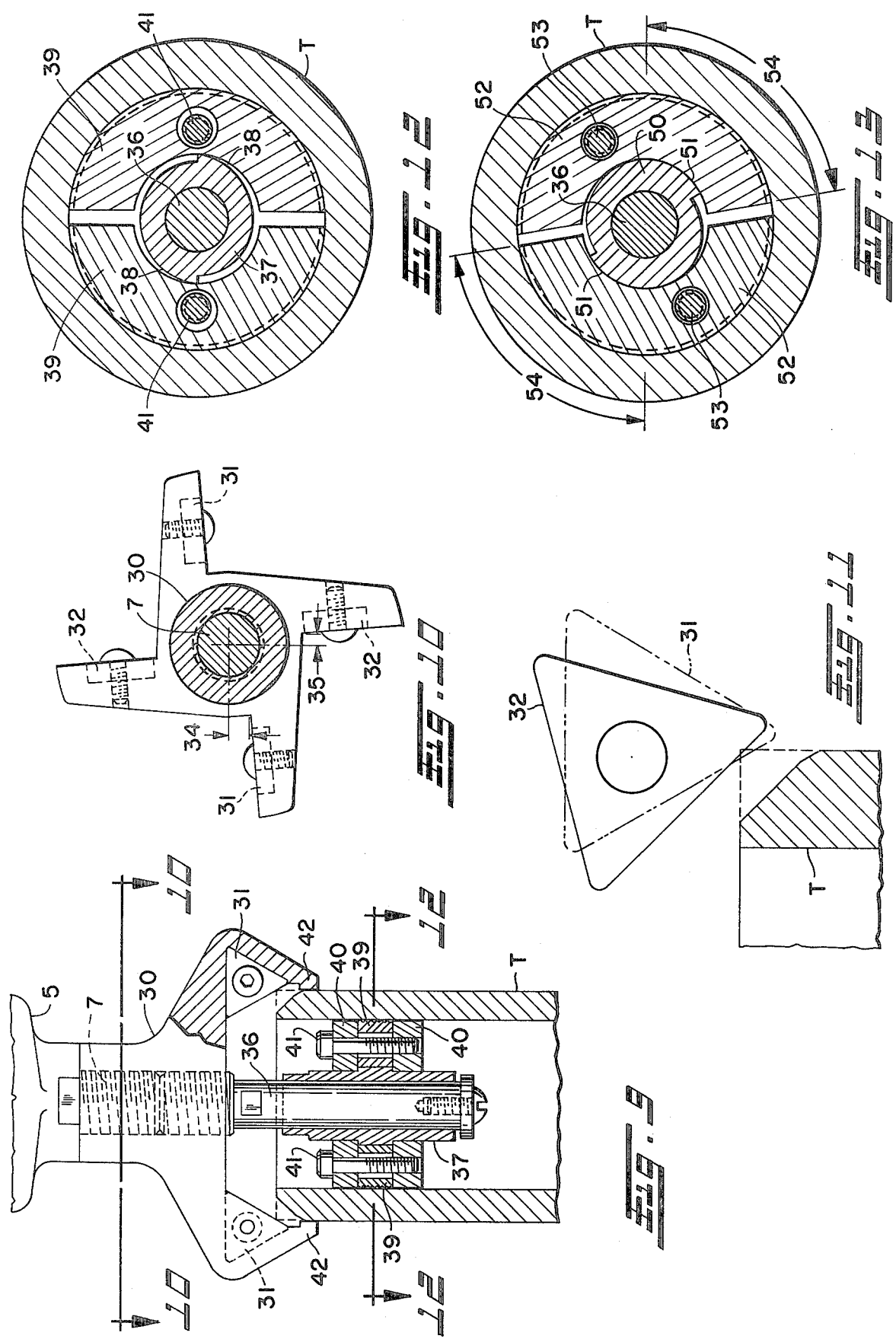

3,999,452

TOOL FOR PREPARING TUBE ENDS FOR WELDING

BACKGROUND OF THE INVENTION

In large stationary boiler tube installations, "hot spots" often develop in the tube and instead of replacing the entire tube it has been found desirable to cut out the defective section of the tube and insert in its place a new section of tube. In order to weld the new section to the old section both must be chamfered to facilitate the welding operation. Existing tube chamfering machines are generally of bulky and heavy construction and cannot conveniently be used in close quarters in the boiler. The invention is also applicable in many other industries such as in shipbuilding, nuclear plants, etc.

SUMMARY OF THE INVENTION

A tool for preparing tube ends for welding characterized in that it is of lightweight compact construction to render it portable for work in close quarters and further characterized in that it is capable of quickly and accurately chamfering tube ends for welding.

Other objects and advantages will appear from the ensuing description.

BRIEF DESCRIPTION OF THE DRAWINGS

FIG. 1 is a side elevation view of a tool embodying the present invention showing the same in operative position ready to chamfer a tube end;

FIG. 2 is a fragmentary radial cross-section view showing the position of the tool head and one of the cutters thereof upon completion of the tube chamfering operation;

FIGS. 3 and 4 are cross-section views taken substantially along the lines 3—3 and 4—4 of FIG. 1;

FIG. 5 is a fragmentary radial cross-section view similar to FIG. 2 except illustrating a cutter for forming a so-called J chamfer at the end of the tube;

FIG. 6 is a side elevation view of another embodiment of the present invention, the tool head being shown partly in cross-section as viewed along the line 6—6 of FIG. 7;

FIG. 7 is a cross-section view taken substantially along the line 7—7 of FIG. 6;

FIG. 8 is a fragmentary radial cross-section view showing one of the cutter inserts indexed to a position to dress the land of the chamfered tube so as to lie in a plane perpendicular to the tube axis;

FIG. 9 is a side elevation view of another embodiment of the invention for use especially in connection with hard-to-cut tubes as of stainless steel or the like;

FIG. 10 is a cross-section view taken substantially along the line 10—10 of FIG. 9;

FIG. 11 is a much enlarged radial cross-section view showing the relationship of two sets of cutter inserts employed in the FIG. 9 embodiment of the invention;

FIG. 12 is a cross-section view taken substantially along the line 12—12 of FIG. 9; and FIG. 13 is a cross-section view similar to FIG. 12 except illustrating a modification.

DETAILED DESCRIPTION OF THE PREFERRED EMBODIMENTS

Referring first to the form of the invention illustrated in FIGS. 1 to 5, the lightweight, compact and portable tool 1 there shown comprises a hand-held air motor 2 having an air pressure inlet port 3 and a squeeze lever 4 for operating an air control valve in said air motor 2. An angle drive unit 5 is connected to the air motor 2, and a tool head 6 is screwed onto the drive shaft 7 of said angle drive unit 5. Screw connected to the tool head 6 is a guide assembly 8 including rotatably supported washers 9 which are of diameter substantially corresponding to the inside diameter of the tube T which is to be chamfered.

The tool head 6 radially adjustably carries cutter arms 10 each of which has an indexable insert 11 as of carbide material which provides a plurality of cutting edges so that when one cutting edge becomes dull, the insert 11 may be indexed to the next position to provide a new sharp cutting edge. In the present case the inserts 11 are, by way of example, shown as being triangular to provide three cutting edges and, of course, as well known in the art, the inserts 11 may be of square form to provide four cutting edges. The arms 10 are overlapped and are slotted to provide for radial adjustment as aforesaid and screw means 12 are operative through bracket 13 and sleeve 14 to clamp the arms 10 together in adjusted relation, said bracket 13 being keyed to the tool head 6 by the screw means 12 and by the upward projection into the tool head slot. A threaded tube 15 receives the threaded portion of the guide assembly 8 and the threaded stud portion of the bracket 13. Moreover, it is preferred that each arm 10 be provided with a guide portion 16 which is in close proximity to the outside diameter of the tube T. As apparent, when the arms 10 are adjusted to a different size tube T, different size washers 9 will be substituted.

It is now apparent that when the tool 1 is positioned as shown in FIG. 1, and when the valve operating lever 4 is depressed, the tool head 6 will be rotated about the axis of the tube T and when the tool 1 is moved downwardly as viewed in FIG. 1, it is guided by the washers 9 and the guide portions 16 whereupon the cutting edges of the inserts 11 will engage the end of the tube T to chamfer it as shown in FIG. 2.

If it be desired to provide a curved chamfer 17, that is, a so-called J preparation of the tube end, a circular cutter insert 18 may be employed and since the cutting edge of the FIG. 5 insert 18 extends around the entire periphery, a new sharp cutting edge may be provided by loosening the screw 19 and rotating the insert 18 a part turn.

The inserts 11 and 18 herein employed are commonly referred to as throwaway cutters since when all of the edges are dull, they may be discarded and new inserts substituted at relatively low cost.

Referring now to the form of the tool illustrated in FIGS. 6, 7, and 8, the air motor 2 and angle drive unit 5 may be of the same type as illustrated in FIG. 1 but the tool head 20 which is screwed onto the drive shaft 7 of the angle drive unit 5 is somewhat modified to provide for three equally spaced cutters 21, the cutter carrying arms 23 being integral with the tool head 20 and adjustment for guiding on the outside diameter of the tube T is effected by screws 24 in the downwardly depending portions of said arms 23 and, of course, guiding on the inside diameter of the tube T is effected by the guide assembly 8 using washers 9 of diameter corresponding to the inside diameter of the tube T. The guide member 8 has an integral threaded portion which is screwed into the tool head 20, and the reference numeral 22 denotes a tubular spacer.

A further feature of the FIGS. 6–8 form of the invention is that one of the arms 23 has a cutter pocket 25 to enable indexing of the cutter insert 21 so that one of its cutting edges lies in a plane normal to the tube axis whereby the land 26 at the chamfered end of the tube T may be dressed to predetermined radial width. In order to facilitate quick change of said one cutter insert 21 chamfer cutting position to land dressing position, it is spring-loaded by the spring 27 so that as viewed in FIG. 7, the insert 21 may be moved downwardly out of its chamfer cutting pocket in said one arm 23 and indexed to fit in the pocket 25 as shown in FIG. 8.

The tool head 30 of FIGS. 9–13 is especially useful in the chamfering of hard-to-cut tubes as of stainless steel, for example, which have a tendency of tearing and in some instances certain stainless steels work harden during the cutting operation. In order to assure a fresh cutting edge, two pairs of cutters 31 and 32 are employed in the form of the invention shown in FIGS. 9–13 with one pair 31 set at 30° as shown in phantom lines in FIG. 11 and the other pair 32 set at 45° as shown in full lines in FIG. 11. In one specific example, the pair of cutters 31 cuts approximately .015 inch ahead of the other pair of cutters 32, this being partly accomplished by the offset 34 of 0.187 inch for the one pair 31 and the offset 35 of 0.125 inch for the other pair 32.

Moreover, the tool head 30 shown in FIGS. 9–13 provides for accurate guiding of the tool head 30 during the axial feeding movement to insure that the cutters 31 and 32 follow a truly circular path coaxial of the tube T. To this end, the shaft 36 of the tool head 30 is a close sliding fit in the bore of the guide member 37 which has cam surfaces 38 operative to cam the tube gripping segments 39 radially outwardly into firm gripping engagement with the inside diameter of the tube T as best shown in FIG. 12 and preferably the external surface of each segment is roughened as by knurling or the like. The segments 39 are radially movable between rings 40 which are secured together by screws 41 and the segments 39 have holes therethrough loosely fitting over the shanks of said screws 41.

The tool head 30 also has downwardly depending guide portions 42 in close proximity to the outside diameter of the tube T.

In FIG. 13, the guide member 50 has cam surfaces 51 which pivot the gripping segments 52 about the screws 53 to achieve firm gripping in the tube T along contact areas 54.

In the use of the FIG. 9 tool head 30, the shaft 36 is detached from the tool head 30 and the shaft 36 and cam assembly are inserted into the tube T. The cam member 37 (or 50) has flats at its upper end by which it may be turned to expand the segments 39 (or 52) into gripping engagement with the tube T at a predetermined depth therein with the bore of the cam member 37 (or 50) located coaxially of the tube axis. Thereafter the shaft 36 is screwed into the tool head 30 and the tool head 30, in turn, is screwed onto the drive shaft 7 of the angle drive unit 5. As the tool head 30 rotates and is advanced toward the tube, the cutting edges of both sets of cutters 31 and 32 follow a truly circular path coaxial with the tube axis to eliminate vibration and to assure fast and accurate cutting of the chamfer on the tube and especially in connection with hard-to-cut tubes made as of stainless steel. It is to be noted that as the tool head 30 is rotated and axially advanced, the shaft 36 likewise rotates and axially advances in the guide member 37 (or 50).

The embodiments of the invention in which an exclusive property or privilege is claimed are defined as follows:

1. A tool for chamfering the end of a tube comprising a tool head having a plurality of radially extending cutter arms with cutting edges engageable with the end of a tube to be chamfered; said tool head having guide means thereon to center said tool head for rotation and axial movement with respect to the tube; and drive means secured to said tool head for rotating the latter and axially advancing said tool head toward the tube end whereby said cutting edges form a chamfer on the end of the tube; said guide means comprising a central axially projecting shaft on said tool head; a guide member having a central bore in which said shaft is rotatable and axially movable; said guide member having cam means and radially outwardly movable tube gripping members actuated by said cam means into frictional engagement in the tube; said guide member having a pair of rings axially retained thereon; said tube gripping members being radially outwardly movable between said rings by said cam means upon rotation of said guide member; said rings having screw means extending with clearance through holes in the respective tube gripping members to permit such radial outward movement of said tube gripping members.

2. The tool of claim 1 wherein said drive means comprises an angle drive assembly having an output shaft secured to said tool head.

3. The tool of claim 1 wherein said cutting edges are on replaceable inserts on the respective arms.

4. The tool of claim 1 wherein said guide means include radially outer portions on said arms extending axially beyond said cutting edges and being in close proximity to the outside diameter of said tube.

5. The tool of claim 1 wherein said cutting edges are on indexable cutting inserts of polygonal form to present new sharp cutting edges when indexed from one position to another.

6. The tool of claim 1 wherein said cutting edges are at different angles with respect to the axis of the tube to form a chamfer on the tube which has a plurality of angles.

7. The tool of claim 6 wherein a cutting edge of smaller angle is axially and circumferentially ahead of a cutting edge of larger angle with reference to the directions of rotation and axial movement of the tool head.

8. The tool of claim 7 wherein there is a pair of diametrically opposite cutting edges of smaller angle, and a pair of diametrically opposite cutting edges of larger angle located circumferentially between said first-mentioned pair of diametrically opposite cutting edges.

* * * * *